United States Patent [19]

Breslin

[11] Patent Number: 5,645,045

[45] Date of Patent: Jul. 8, 1997

[54] FLUID HEATING APPARATUS USING LIGHT ENERGY AND METHOD THEREOF

[75] Inventor: Patrick William Breslin, Peoria, Ariz.

[73] Assignee: BRES LLC, Glendale, Ariz.

[21] Appl. No.: 458,694

[22] Filed: Jun. 2, 1995

[51] Int. Cl.$^6$ ........................................ F24J 2/24
[52] U.S. Cl. .................. 126/669; 126/698; 126/704; 126/714
[58] Field of Search ........................ 126/669, 668, 126/698, 707, 711, 714, 663, 906, 904, 563, 565, 704

[56] References Cited

U.S. PATENT DOCUMENTS

| | | | |
|---|---|---|---|
| 4,066,063 | 1/1978 | Gross et al. | 126/665 |
| 4,214,574 | 7/1980 | O'Hanlon | 126/648 |
| 4,239,035 | 12/1980 | Brooks et al. | 126/669 X |
| 4,271,823 | 6/1981 | Erb | 126/669 |
| 4,426,999 | 1/1984 | Evans et al. | 126/669 |
| 4,607,616 | 8/1986 | Lehmann | 126/669 |
| 4,898,153 | 2/1990 | Sherwood | 126/665 |

FOREIGN PATENT DOCUMENTS 2729734  1/1979  Germany .............. 126/669

*Primary Examiner*—Larry Jones
*Attorney, Agent, or Firm*—Harry M. Weiss; Jeffrey D. Moy; Harry M. Weiss & Associates, P.C.

[57] ABSTRACT

The present invention relates to a solar energy water heating apparatus. The apparatus is comprised of a solar panel having a plurality of channels through which the water flows. Each channel has a top lens portion which focuses and intensifies the light energy of the sun on the water. This allows the water to be heated in a more efficient and effective manner. An end cap is coupled to each end of the solar panel. The end caps prevent the water from leaking out of the solar panel. A nozzle is coupled to the end cap which allows the water to enter the apparatus and exit the solar panel once the water has been heated.

20 Claims, 2 Drawing Sheets

FLUID HEATING APPARATUS USING LIGHT ENERGY AND METHOD THEREOF

BACKGROUND OF THE INVENTION

1. Field of the Invention

This invention relates generally to an apparatus for heating a liquid and, more specifically, to a cost effective solar energy water heating apparatus which uses a lens to intensify the light energy from the sun in order to heat the water.

2. Description of the Prior Art

Currently, there are numerous devices which use solar energy for heating water. See U.S. Pat. No. 4,066,063 which discloses a device for the transmission of solar energy to a liquid medium; U.S. Pat. No. 4,214,574 which discloses a solar heat collector which is comprised of a box having resilient heat insulating material and a serpentined tube, positioned within the box, that acts as a solar heat collecting element which heats the fluid within the tube; U.S. Pat. No. 4,898,153 which discloses a solar energy panel for domestic and industrial hot water heating.

While current solar energy water heating devices do work, there are several problems with these devices. The biggest problem is the cost associated with these devices. Current solar panels are fairly expensive to produce. Not only is the cost relatively high to produce a solar panel, but the cost to maintain the system is also fairly high. Current solar energy water heating devices are also not very durable. These devices tend to break down fairly often even in ideal operating conditions. As such, an owner of a solar energy water heating device is constantly installing new solar panels or repairing the old panels in order for the system to continuously operate. Current solar energy water heating devices are also very inefficient when the sun is not directly above the panel. As such, when the sun moves from its peak position relative to the solar panel, the solar energy water heating device becomes less and less efficient. Thus, a longer period of time is required in order for the device to heat the water.

Therefore, a need existed to provide an improved solar energy water heating device and method therefor. The improved device must be relatively inexpensive to build and maintain. The improved solar energy water heating device must also be extremely reliable and durable even in harsh conditions. The improved solar energy water heating device must also be more efficient than current devices. The improved device must be capable of heating a liquid even if the sun is not directly above the solar panel.

SUMMARY OF THE INVENTION

In accordance with one embodiment of the present invention, it is an object of the present invention to provide an improved solar energy water heating apparatus and method therefor.

It is another object of the present invention to provide an improved solar energy water heating apparatus and method therefor that is relatively inexpensive to build and maintain.

It is still another object of the present invention to provide an improved solar energy water heating apparatus and method therefor that is more reliable and durable than present solar energy water heating apparatus.

It is still another object of the present invention to provide an improved solar energy water heating apparatus and method therefor that is more efficient than current devices and is capable of heating the water even if the sun is not directly above the solar panel.

BRIEF DESCRIPTION OF THE PREFERRED EMBODIMENTS

In accordance with one embodiment of the present invention, an apparatus for heating a liquid using light energy is disclosed. The apparatus is comprised of a lens means for focusing the light energy on the liquid to be heated. A bottom portion means is coupled to the lens means for defining a liquid tight tubular passage in which the liquid to be heated flows. An end cap means is coupled to each end of the tubular passage for forming a liquid tight seal to prevent the liquid from spilling out of the tubular passage. A nozzle means is coupled to the end cap means for allowing the liquid to enter the tubular passage to be heated and for allowing the liquid to exit the tubular passage once the liquid has been heated.

In accordance with another embodiment of the present invention, a method for providing an apparatus for heating a liquid using light energy is disclosed. The method comprises the steps of: providing lens means for focusing the light energy on the liquid to be heated; providing bottom portion means coupled to the lens means for defining a liquid tight tubular passage in which the liquid to be heated flows; providing end cap means coupled to each end of the tubular passage for forming a liquid tight seal to prevent the liquid from spilling out of the tubular passage; and providing nozzle means coupled to the end cap means for allowing the liquid to enter the tubular passage to be heated and for allowing the liquid to exit the tubular passage once the liquid has been heated.

The foregoing and other objects, features, and advantages of the invention will be apparent from the following, more particular, description of the preferred embodiments of the invention, as illustrated in the accompanying drawing.

DETAILED DESCRIPTION OF THE PREFERRED EMBODIMENTS

Figure 1:
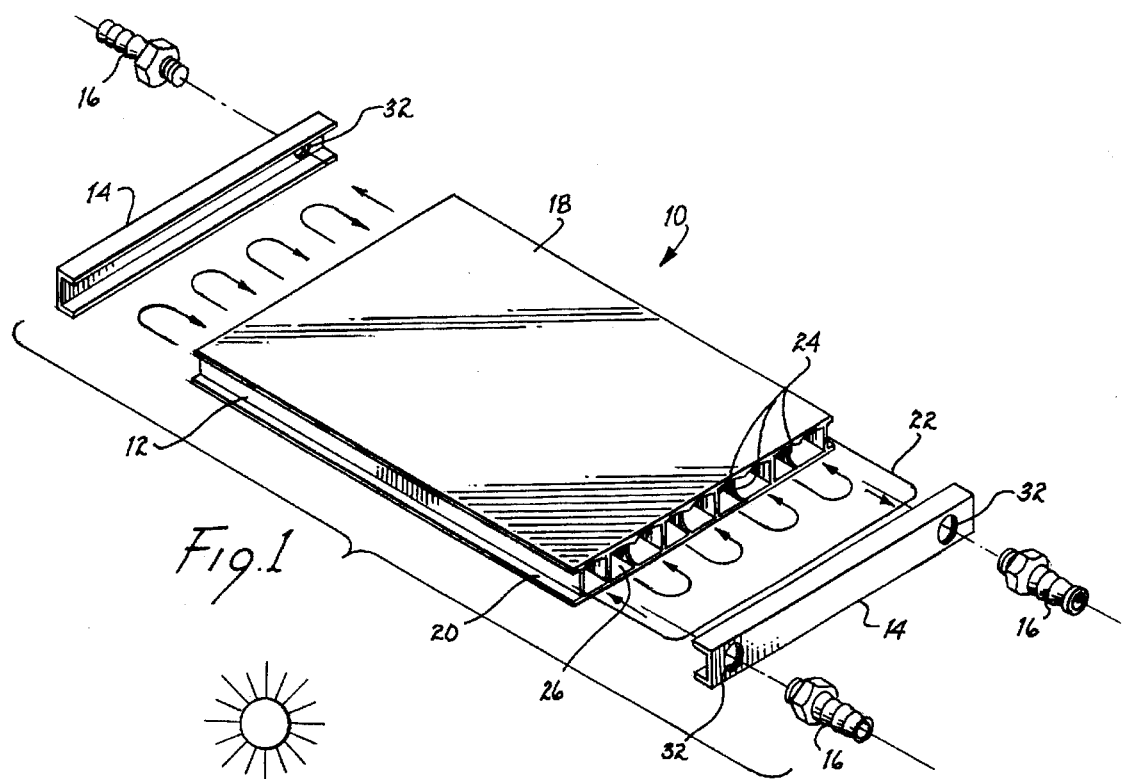
FIG. 1 is an exploded perspective view of the solar energy water heating apparatus of the present invention.

Referring to FIG. 1, a solar energy liquid (i.e. water) heating apparatus 10 (hereinafter apparatus 10) is shown.

The apparatus 10 is comprised of a solar panel 12, a pair of end caps 14, and at least two nozzles 16.

The solar panel 12 is comprised of a top lens portion 18. The lens portion 18 focuses the light energy from the sun on the liquid that is being heated by the apparatus 10. No matter what the position of the sun is relative to the apparatus 10, the lens portion 18 will focus the light energy from the sun on the liquid to be heated. This makes the apparatus 10 simpler and more efficient than current solar devices which must rotate in order to keep the device perpendicular to the sun light. The lens portion 18 also intensifies the magnitude of the light energy thereby allowing the apparatus 10 to heat the liquid more efficiently and quicker than current devices.

The lens portion 18 is coupled to a bottom portion 20 to form a liquid tight tubular passageway 22. A liquid is then passed through the tubular passageway 22. The lens portion 18 focuses the light energy from the sun on the liquid and heats the liquid as the liquid passes through the tubular passageway 22. A plurality of wall members 24 are coupled to the lens portion 18 and the bottom portion 20 to form a plurality of channels 26 within the tubular passageway 22.

Figure 3:
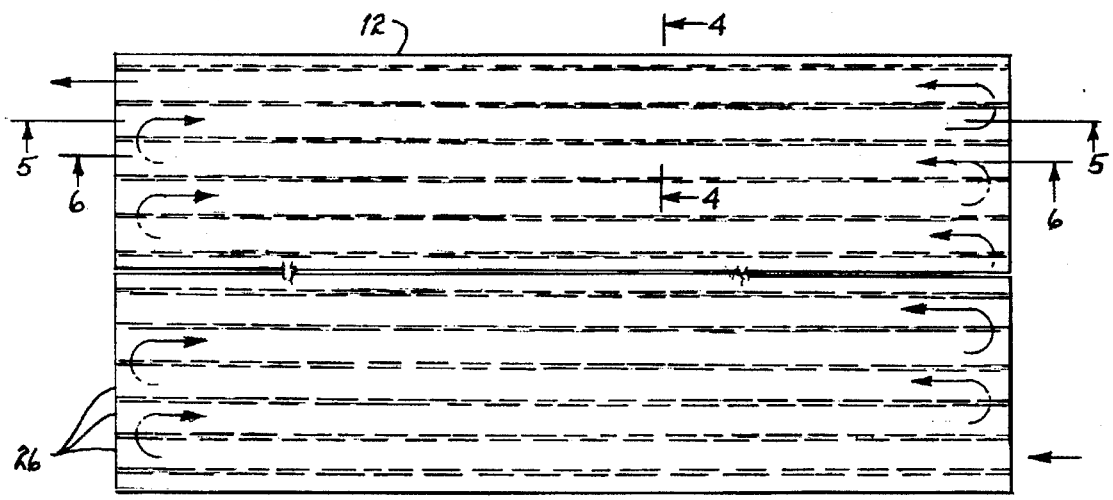
FIG. 3 is a top view of the solar panel section of the solar energy water heating apparatus of FIG. 1, the arrows depicting the flow of a liquid within the solar panel.

Referring to FIG. 3, a top view of the solar panel 12 is shown. The arrows depict the flow of the liquid within the solar panel 12. Once the liquid enters the solar panel, the liquid flows up one channel 26 and down an adjacent channel 26. This continues until the liquid flows through the last channel 26 and exits the solar panel 12.

Figure 4:
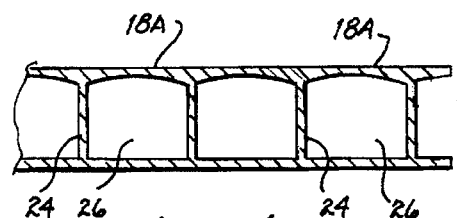
FIG. 4 is a cross-sectional side view of the solar panel section of the solar energy water heating apparatus of FIG. 3 taken along line 4—4.

Referring to FIG. 4, a more detailed view of the wall members 24 is shown. Each of the plurality of channels 26 has a top lens portion 18A which focuses and intensifies the light energy from the sun directly on the liquid flowing through each of the plurality of channels 26.

Figure 5:
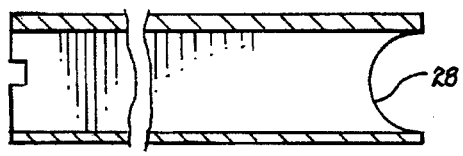
FIG. 5 is a cross-sectional front view of the solar panel section of the solar energy water heating apparatus of FIG. 3 taken along line 5—5.
Figure 6:
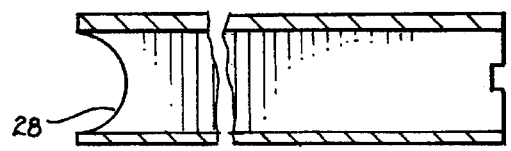
FIG. 6 is a cross-sectional front view of the solar panel section of the solar energy water heating apparatus of FIG. 3 taken along line 6—6.

Referring to FIGS. 5 and 6, it can be seen that one end of each of the plurality of wall members 24 has a recessed portion 28 thereon. The recessed portion 28 of the wall member 24 allows the liquid to flow up one channel 26, around the recessed portion 28, and down an adjacent channel 26. This process continues until the liquid flows through the last channel 26 of the solar panel and exits the apparatus 10.

Figure 2A:
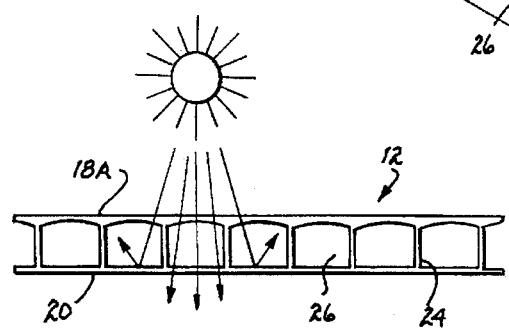
FIG. 2a is a side view of one embodiment of the solar panel section of the solar energy water heating apparatus of FIG. 1.

Referring to FIG. 2a, one embodiment of the solar panel 12 is shown. As can be seen from FIG. 2a, the bottom portion 20 of the solar panel has a refractive property which bends the light energy from the sun back towards the lens portion 18A. The refracted light energy travels through a greater distance of each channel 26 thereby allow the liquid within each channel 26 to absorb more light energy. This increases the efficiency of the solar panel 12 since less time and energy is needed to heat the liquid.

Figure 2C:
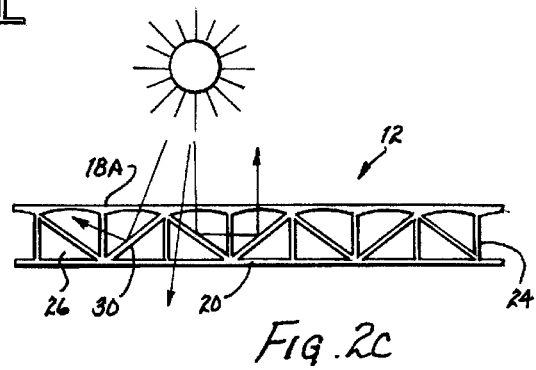
FIG. 2c is a side view of a third embodiment of the solar panel section of the solar energy water heating apparatus of FIG. 1.
Figure 2B:
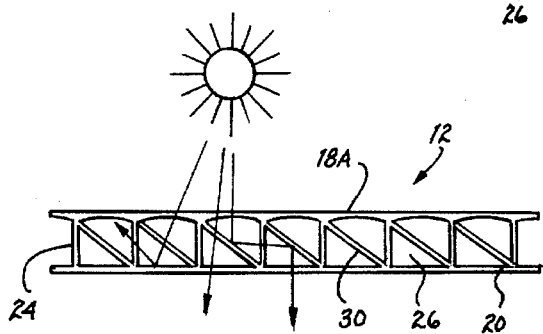
FIG. 2b is a side view of a second embodiment of the solar panel section of the solar energy water heating apparatus of FIG. 1.

Referring to FIGS. 2b–2c, two different embodiments of the solar panel 12 are shown. A refractive wall 30 is coupled to the top lens 18A and the bottom portion 20 of each of the plurality of channels 26. The refractive wall 30 bends the light energy from the sun allowing the light energy to travel through a greater distance of the solar panel 12. This allows the liquid in the solar panel 12 to absorb more energy thereby increasing the efficiency of the solar panel 12. The lens 18A, the bottom portion 20, the plurality of wall members 24, and the refractive walls 30 may be made from a translucent plastic material, polycarbonate sheets, or similar material. These types of materials have a refractive property and are translucent. This allows some of the light energy to be refracted thereby allowing the liquid to absorb more energy, while further allowing some of the sun light to be transmitted through the panel. As such, the solar panel 12 can be used in many different applications such as sky lights, Arizona rooms, atriums, and swimming pool fencing (i.e. fencing around the swimming pool to prevent people from falling into the pool and for solar heating of the pool).

Figure 7:
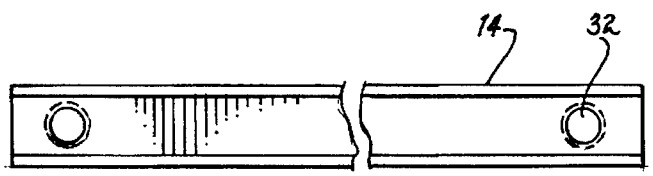
FIG. 7 is a front view of an end cap of the solar energy water heating apparatus of FIG. 1.
Figure 8:
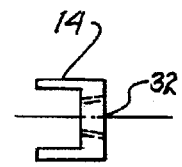
FIG. 8 is a side view of an end cap of the solar energy water heating apparatus of FIG. 1.

Referring to FIGS. 1, 7, and 8, an end cap 14 is coupled to each end of the solar panel 12. The end cap 14 forms a liquid tight seal to prevent any liquid from spilling out of the solar panel 12. The end cap 14 may have an opening 32. A nozzle 16 is coupled to the opening 32 to allow the liquid to enter the solar panel 12. The liquid then flows through the plurality of channels 26, all the time being heated by the light energy from the sun. When the liquid flows through the last channel 26 of the solar panel 12, the liquid exits the solar panel 12 through a nozzle 16 which is coupled to an opening 32 in the end cap 14.

While the invention has been particularly shown and described with reference to preferred embodiments thereof, it will be understood by those skilled in the art that the foregoing and other changes in form and details may be made therein without departing from the spirit and scope of the invention.

I claim:

1. An apparatus for heating a liquid using light energy comprising, in combination:

lens means for focusing said light energy on said liquid to be heated;

bottom portion means coupled to said lens means for defining a water tight tubular passage in which said liquid to be heated flows, said bottom portion means comprising refractive means for refracting said light energy through a greater distance of said tubular passage increasing adsorption of said light energy by said liquid within said tubular passage;

end cap means coupled to each end of said tubular passage for forming a liquid tight seal to prevent said liquid from spilling out of said tubular passage; and nozzle means coupled to said end cap means for allowing said liquid to enter said tubular passage to be heated and for allowing said liquid to exit said tubular passage once said liquid has been heated.

2. The apparatus of claim 1 further comprising a plurality of wall means coupled to said lens means and said bottom portion means for defining a plurality of channels within said tubular passage in which said liquid being heated by said light energy flows.

3. The apparatus of claim 2 wherein one end of said wall means is recessed to allow said liquid to flow through one of said plurality of channels, around said recessed end of said wall means, and through an adjacent channel.

4. The apparatus of claim 2 wherein said lens means focuses said light energy on said liquid flowing through each of said plurality of channels.

5. The apparatus of claim 2 wherein each of said plurality of channels further comprises refractive means coupled to said wall means for refracting said light energy through a greater distance of each of said plurality of channels increasing the adsorption of said light energy by said liquid flowing through each of said plurality of channels.

6. The apparatus of claim 5 wherein said lens means, said bottom portion means, said wall means, and said refractive means are made of a translucent plastic material.

7. The apparatus of claim 5 wherein said lens means, said bottom portion means, said wall means, and said refractive means are made of polycarbonate sheets.

8. The apparatus of claim 1 wherein one of said end cap means contains both nozzle means for allowing said liquid to enter said tubular passage to be heated and nozzle means for allowing said liquid to exit said tubular passage once said liquid has been heated.

9. The apparatus of claim 1 wherein one of said end caps contains nozzle means for allowing said liquid to enter said tubular passage to be heated and a second end cap contains nozzle means for allowing said liquid to exit said tubular passage once said liquid has been heated.

10. An apparatus for heating a liquid using light energy comprising, in combination:

lens means for focusing said light energy on said liquid to be heated;

bottom portion means coupled to said lens means for defining a liquid tight tubular passage in which said liquid to be heated flows;

end cap means coupled to each end of said tubular passage for forming a liquid tight seal to prevent said liquid from spilling out of said tubular passage;

wall means coupled to said lens means and said bottom portion means for defining a plurality of channels within said tubular passage in which said liquid being heated by said light energy flows, one end of said wall means being recessed to allow said liquid to flow through one of said plurality of channels, around said recessed end of said wall means, and through an adjacent channel;

refractive means coupled to said wall means for refracting said light energy through a greater distance of each of said plurality of channels increasing the adsorption of said light energy by said liquid flowing through each of said plurality of channels; and nozzle means coupled to said end cap means for allowing said liquid to enter said tubular passage to be heated and for allowing said liquid to exit said tubular passage once said liquid has been heated.

11. A method for providing an apparatus for heating a liquid using light energy comprising the steps of:

providing lens means for focusing said light energy on said liquid to be heated;

providing bottom portion means coupled to said lens means for defining a liquid tight tubular passage in which said liquid to be heated flows, said bottom portion means comprising refractive means for refracting said light energy through a greater distance of said tubular passage increasing adsorption of said light energy by said liquid within said tubular passage;

providing end cap means coupled to each end of said tubular passage for forming a liquid tight seal to prevent said liquid from spilling out of said tubular passage; and providing nozzle means coupled to said end cap means for allowing said liquid to enter said tubular passage to be heated and for allowing said liquid to exit said tubular passage once said liquid has been heated.

12. The method of claim 11 further comprising the step of providing a plurality of wall means coupled to said lens means and said bottom portion means for defining a plurality of channels within said tubular passage in which said liquid being heated by said light energy flows.

13. The method of claim 12 further comprising the step of providing a recessed portion at one end of each of said wall means to allow said liquid to flow through one of said plurality of channels, around said recessed portion at one end of said wall means, and through an adjacent channel.

14. The method of claim 12 wherein said step of providing lens means further comprises the step of providing lens means for focusing said light energy on said liquid flowing through each of said plurality of channels.

15. The apparatus of claim 12 further comprising the step of providing refractive means coupled to said wall means of each of said plurality of channels for refracting said light energy through a greater distance of each of said plurality of channels increasing the adsorption of said light energy by said liquid flowing through each of said plurality of channels.

16. The method of claim 15 wherein said step of providing lens means, bottom portion means, wall means, and refractive means further comprises the step of providing said lens means, said bottom portion means, said wall means, and said refractive means out of a translucent plastic material.

17. The method of claim 15 wherein said step of providing lens means, bottom portion means, wall means, and refractive means further comprises the step of providing said lens means, said bottom portion means, said wall means, and said refractive means out of polycarbonate.

18. The method of claim 11 wherein said step of providing nozzle means further comprises the step of coupling said nozzle means for allowing said liquid to enter said tubular passage to be heated to one of said end means and coupling said nozzle means for allowing said liquid to exit said tubular passage once said liquid has been heated to said one of said end means.

19. The method of claim 11 wherein said step of providing nozzle means further comprises the step of coupling nozzle means for allowing said liquid to enter said tubular passage to be heated to one of said end means and coupling said nozzle means for allowing said liquid to exit said tubular passage once said liquid has been heated to another of said end means.

20. An apparatus for heating a fluid using light energy comprising, in combination:

lens means for focusing said light energy on said fluid to be heated;

bottom portion means coupled to said lens means for defining a fluid tight tubular passage in which said fluid to be heated flows, said bottom portion means comprising refractive means for refracting said light energy through a greater distance of said tubular passage increasing adsorption of said light energy by said liquid within said tubular passage;

end cap means coupled to each end of said tubular passage for forming a fluid tight seal to prevent said fluid from flowing out of said tubular passage; and nozzle means coupled to said end cap means for allowing said fluid to enter said tubular passage to be heated and for allowing said fluid to exit said tubular passage once said fluid has been heated.

* * * * *